(12) United States Patent
Musick et al.

(10) Patent No.: US 11,588,992 B2
(45) Date of Patent: Feb. 21, 2023

(54) SURROUND-VIEW IMAGING SYSTEM

(71) Applicant: Jabil Optics Germany GmbH, Jena (DE)

(72) Inventors: David Musick, Jena (DE); Norbert Leclerc, Heidelberg (DE); Hendrik Zachmann, Leipzig (DE)

(73) Assignee: Jabil Optics Germany GmbH, Jena (DE)

( * ) Notice: Subject to any disclaimer, the term of this patent is extended or adjusted under 35 U.S.C. 154(b) by 0 days.

(21) Appl. No.: 16/892,463

(22) Filed: Jun. 4, 2020

(65) Prior Publication Data
US 2020/0389611 A1 Dec. 10, 2020

(30) Foreign Application Priority Data

Jun. 4, 2019 (EP) .................................... 19178290

(51) Int. Cl.
| | |
|---|---|
| *H04N 5/369* | (2011.01) |
| *H04N 5/225* | (2006.01) |
| *H04N 5/232* | (2006.01) |
| *G01S 17/931* | (2020.01) |
| *G01S 17/894* | (2020.01) |

(52) U.S. Cl.
CPC ....... *H04N 5/36965* (2018.08); *H04N 5/2259* (2013.01); *H04N 5/23238* (2013.01); *G01S 17/894* (2020.01); *G01S 17/931* (2020.01)

(58) Field of Classification Search
CPC ............ H04N 5/36965; H04N 5/2259; H04N 5/23238; G01S 17/931; G01S 17/894; G01S 7/4816; G01S 17/08; G02B 17/0856; G02B 13/06
See application file for complete search history.

(56) References Cited

U.S. PATENT DOCUMENTS

| | | | |
|---|---|---|---|
| 7,593,057 B2 * | 9/2009 | Yee .................... | G03B 17/17 352/69 |
| 9,239,389 B2 * | 1/2016 | Jeong ................. | G02B 17/0808 |
| 9,854,164 B1 * | 12/2017 | Kozko .................. | G02B 13/06 |
| 2002/0012059 A1 | 1/2002 | Wallerstein et al. | |
| 2003/0193607 A1 * | 10/2003 | Driscoll, Jr. ......... | H04N 5/2628 348/E7.087 |

(Continued)

FOREIGN PATENT DOCUMENTS

DE 102017125686 A1 5/2019

*Primary Examiner* — Jason A Flohre
(74) *Attorney, Agent, or Firm* — Young Basile Hanlon & MacFarlane, P.C.

(57) ABSTRACT

The present invention refers to a surround-view imaging system for time-of-flight (TOF) depth sensing applications and a time-of-flight sensing based collision avoidance system comprising such an imaging system. The imaging system for time-of-flight depth sensing applications comprises a lens system, adapted for imaging angles of view (AOV) larger than 120° in an image on an image plane; a sensor system, adapted to convert at least a part the image in the image plane into an electronic image signal; and an evaluation electronics, adapted to analyze the electronic image signal and to output resulting environmental information; wherein the lens system and/or the sensor system are designed for specifically imaging fields of view (FOV) starting at zenithal angles larger than 60°.

12 Claims, 5 Drawing Sheets

(56) References Cited

U.S. PATENT DOCUMENTS

| | | | |
|---|---|---|---|
| 2003/0197780 A1* | 10/2003 | Iwaki | G06T 1/0021 382/284 |
| 2004/0169724 A1* | 9/2004 | Ekpar | G06T 3/0062 348/333.01 |
| 2006/0274170 A1* | 12/2006 | Azuma | H04N 9/04517 348/E5.079 |
| 2010/0002070 A1* | 1/2010 | Ahiska | H04N 5/23299 348/E7.001 |
| 2010/0238568 A1 | 9/2010 | Togino et al. | |
| 2013/0215298 A1* | 8/2013 | Kawabe | G06T 5/006 348/241 |
| 2015/0042765 A1* | 2/2015 | Pfister | B60R 1/002 348/48 |
| 2016/0063710 A1* | 3/2016 | Tanaka | G05D 1/0246 382/103 |
| 2016/0077315 A1* | 3/2016 | Trubko | G02B 5/208 359/356 |
| 2016/0188985 A1 | 6/2016 | Kim et al. | |
| 2016/0274589 A1* | 9/2016 | Templeton | G01S 17/10 |
| 2017/0310952 A1 | 10/2017 | Adomat et al. | |
| 2018/0307009 A1* | 10/2018 | Lang | H04N 5/23238 |
| 2019/0162941 A1* | 5/2019 | Maezawa | G02B 27/0018 |
| 2019/0179016 A1* | 6/2019 | Raring | H01S 5/02212 |
| 2019/0204423 A1* | 7/2019 | O'Keeffe | G01S 7/4817 |

* cited by examiner

SURROUND-VIEW IMAGING SYSTEM

CROSS-REFERENCE TO RELATED APPLICATION(S)

This application claims priority to and the benefit of European Patent Application No. 19178290.3 filed Jun. 4, 2019, the entire disclosure of which is hereby incorporated by reference.

TECHNICAL FIELD

The present invention refers to a surround-view imaging system for time-of-flight (TOF) depth sensing applications and a time-of-flight depth sensing based collision avoidance system comprising such an imaging system. Various types of optical systems as well as sensor configurations can provide a range of desired zenithal and azimuthal angle combinations for a surround-view time-of-flight depth sensing based collision avoidance system.

BACKGROUND

In many fields, including security, automotive and robotics, there is an increasing demand to obtain a surround-view perspective for time-of-flight depth measurements relative to a given reference point. This reference point typically corresponds to some illumination and imaging system. Depending on the application, this reference point may be in a stationary position (as it is often the case with security cameras), or it may be positioned on a moving object (such as an automobile, a forklift, or a mobile robot).

For obtaining a surround-view image, multiple individual imaging systems are typically required and they have to be arranged such that their individual field of views (FOV) can be combined in the form of a panoramic environmental view. Implementing multiple imaging systems produces higher costs, especially when the various sensors are also considered. Therefore, technical solutions to create a comparable surround-view image on a single sensor by a single lens system are demanded. In this context, surround-view means that a 360° panoramic view can be imaged by a single imaging system (at least in principle).

A typical time-of-flight depth sensing system consists of an illumination system including beam forming (e.g. electronic and/or optical beam forming in a temporal and/or spatial manner), an imaging system comprising a receiving optics (e.g. a single lens or a lens system/objective) and a sensor for image detection, and an evaluation electronics for calculating the distances and maybe setting some alarms from the detected image signal. The illumination system typically sends out modulated or pulse light. The distance of an object can be calculated from the time-of-flight which the emitted light requires for traveling from the illumination system to the object and back to the receiving optics.

Optical beam forming can be achieved by a beam shaping optics included in the illumination system. The beam shaping optics and the receiving optics can be separate optical elements (one-way optics) or the beam shaping optics and the receiving optics can use single, multiple or all components of the corresponding optics commonly (two-way optics). Such time-of-flight depth sensing systems are typically referred to as systems using light/laser ranging and detection (LiDAR/LaDAR).

A surround-view image can be produced by using a wide-angle lens (e.g. a 'fisheye' lens or rectilinear lens) as the first lens in a lens system of an imaging system. Wide-angle lenses can have an angle of view (AOV), i.e., the maximum zenithal angle for which a lens can provide an image, of more than 180°. Lenses with an AOV of more than 180° are also called ultra wide-angle lenses. Angles of view up to around 300° can be achieved. In a normal axially symmetric imaging system the imageable azimuthal angle range is typically 360°, which allows surround-view in the azimuthal direction. Therefore, with an ultra wide-angle lens solid angles $\Omega$ of up to around $3\pi$ steradiant can be imaged. Wide-angle lenses typically show a strong curvilinear barrel distortion, which can to some degree optically corrected in rectilinear lenses. An optical barrel distortion correction can also be included in the design of an associated lens system. Lens systems with an angle of coverage larger than 180° are called ultra wide-angle lens systems.

A collision avoidance system for ground-based applications often only requires surround view imaging only in a limited zenithal angle range near the ground. For collision avoidance system in vehicles, where the optical axis of the lens system is typically pointing upwards "into the sky", the lower zenithal angles between 0° and 60° are in most cases only of minor interest. However, standard wide-angle lens systems are designed to provide the best imaging results for the central region of the image. In the outer regions, the image often shows only a reduced sharpness and the linearity of the projection becomes low. Even when applying elaborate optical correction, aberration effects like enhanced curvature and optical distortion in the zone of interest (ZOI) are difficult to handle with standard ultra wide-angle lens systems. Due to the wide angle of view, object rays are entering the optical system from all possible directions, causing noise by undesired internal reflections inside the lens system. Further, bright sunlight or other intense light sources outside the ZOI can over-illuminate the sensor and decrease the signal-to-noise ratio (SNR) of the sensor detection. The electronic image signal of the sensor will thus include the undesired parts of the image which still have to be processed by the calculation electronics with some efforts.

The objective problem of the invention is therefore related to the problem of providing a surround-view imaging system for time-of-flight depth sensing applications and a time-of-flight depth sensing based collision avoidance system comprising such an imaging system which avoid or at least minimize the problems in the prior art. In particular, the invention refers to a surround-view imaging system in which a range of desired zenithal and azimuthal angle combinations for a surround-view time-of-flight based collision avoidance systems shall be provided.

SUMMARY

The invention solves the objective problem by at least providing an imaging system comprising a lens system, adapted for imaging angles of view larger than 120° in an image on an image plane; a sensor system, adapted to convert at least a part the image in the image plane into an electronic image signal; and an evaluation electronics, adapted to analyze the electronic image signal and to output resulting environmental information; wherein the lens system and/or the sensor system are designed for specifically imaging fields of view starting at zenithal angles larger than 60°.

Preferably, the lens system is further adapted to image around the optical axis of the lens system (axially symmetric imaging) in an image on an image plane perpendicular to the optical axis of the lens system (perpendicular imaging).

However, some components of the lens system may also be arranged off-axial or the image plane could be shifted and/or tilted with respect to the optical axis of the optical system. Such embodiments allow an increased flexibility for matching the FOV of the imaging system to a desired ZOI of a specific TOF depth sensing application.

The environmental information which is outputted by the evaluation electronics can be any type of information contained in the image signal. In some embodiments only a trigger signal may be outputted as environmental information. The trigger signal can be utilized to trigger an external event. In a collision avoidance system for a mobile robot, for example, it may not be required to reconstruct a full three-dimensional image (3D image) or a 3D point cloud from the image signal. A simple trigger signal correlated to a minimum allowable distance will be sufficient to avoid a collision by instantly stopping the robot. Other types of environmental information may be two-dimensional images (2D images) or fully reconstructed 3D images or 3D point clouds. These images may include optical distortions caused by the lens system. However, in a collision avoidance system an additional calculation of the distances with pre-defined lens system data could be required. The evaluation electronics can further output environmental information in the form of identified metadata based on image recognition results. In this case the outputted environmental information could also be, for example, an array consisting of two elements; an object identifier and a numerical value for the distance from the reference point to the recognized object.

In some applications, it may also be required to present the environmental information to a human. While a collision avoidance system may be able to work with 2D images, 3D images or 3D point clouds including optical distortions from the lens system, for a human these images should be presented distortion free or distortion corrected. Therefore, the evaluation electronics may be further adapted to correct optical distortions in the image signal and to output undistorted image information. That means predefined lens system data is used by the evaluation electronics to correct the optical distortions in the electronic image signal to output environmental information as undistorted image information. For ease in displaying or processing the image gathered by the sensor, software or an equivalent circuitry may be implemented in the evaluation electronics to remove the distortion form the electronic image signal and to form image information with a rectangular or trapezoidal format. From the undistorted image information also a distortion-free 3D point cloud may be calculated.

The invention is based on the finding that for most TOF depth sensing applications using wide-angle lens systems the corresponding ZOI lies in field of views starting at zenithal angles larger than 60°. Lower zenithal angles ranges may be only of minor importance for such applications. As standard wide-angle lens systems are typically designed to provide the best imaging results in the central region of the image, most of the imaging capabilities are wasted for imaging regions outside the ZOI. By designing a lens system, for example, specifically for imaging FOV starting at zenithal angles larger than 60°, the lens system can be optimized for the relevant ZOI of a specific TOF depth sensing application. In particular, the lens system may be optimized to provide diffraction-limited imaging for all imaging points in the FOV. The imaging for zenithal angles less than 60° can be fully neglected in the design of a corresponding lens system.

In a preferred embodiment, the lens system is a panomorph lens system using panomorph distortion as a design parameter for increasing the magnification of zenithal angles in the field of view compared to zenithal angles outside the field of view. A panomorph lens system is specifically designed to improve the optical performances in a predefined ZOI. The image of the FOV in the image plane is then enlarged compared to the image regions outside the FOV. When the image is detected by the sensing system, the image resolution can thus be enhanced. By using panomorph distortion in the lens system, the image resolution for a predefined sensor can be optimized by adapting the image scale to the available sensor surface. Therefore, the lens system can be optimized for specifically imaging FOV starting at zenithal angles larger than 60°.

In another preferred embodiment, the lens system is an anamorphic lens system adapted to change the aspect ratio of the image in the image plane. In an anamorphic lens system, cylindrical and/or toroidal lenses are used for non-axially symmetric imaging. Anamorphic designs maybe useful if a predefined sensor and the image in the image plane show different aspect ratios. Therefore, the sensor may not able to detect the whole image or parts of the sensor will not be used for imaging, which means that available image resolution is wasted. For matching the different aspect ratios, anamorphic distortion can be integrated in the lens system. Also in this embodiment the lens system can be optimized for specifically imaging FOV starting at zenithal angles larger than 60°.

In another preferred embodiment, the central region of the entrance aperture of the lens system is covered by a blind. The blind blocks rays entering from undesired small zenithal angles below 60°. Preferably, the blind can be a surface matched (e.g. curved) circular blind, a corresponding elliptical blind or a corresponding freeform blind. The blind may also cover zenithal angles larger than 60° for some regions. The form of the blind can be used to further define the effective FOV of the imaging system, which means that specific zenithal and/or azimuthal angle ranges may be selectively blocked by the blind.

In an alternative preferred embodiment at least a single region other than the central region of the entrance aperture of the lens system is covered by a blind. This embodiment can be can be used to block specific zenithal and/or azimuthal angle ranges by the blind in lens systems where another design approach is used for specifically imaging FOV starting at zenithal angles larger than 60°. In this case, the blind provides a flexible blocking function.

In another preferred embodiment, the lens system is a catadioptric lens system in which refractive and reflective optical elements are combined. A catadioptric lens system is typically used when extremely compact lens system designs are required. Further, chromatic and off-axis aberration can be minimized within such systems. Preferably, the first lens of the lens system is a biconcave lens element in which object rays are reflected by a single total internal reflection. Also preferred is that the first lens of the lens system is a complex freeform lens element in which object rays are reflected by two total internal reflections. However, reflections may also occur on surfaces of the lens system which are designed as metallic or dielectric mirrors.

In another preferred embodiment, the lens system comprises plastic lenses, glass lenses or a combination thereof. Plastic lenses have a lower weight and a favorable price compared to standard glass lenses, however, glass lenses can provide a higher optical quality. A lens system which combines both types of lens materials can have good optical quality, a low weight and a lower price compared to lens systems comprising only glass lenses.

In another preferred embodiment, the sensor system comprises at least a single 2D sensor, at least a single 1D sensor or a combination thereof. A single 2D sensor may detect the image of the complete FOV of the imaging system. However, for some applications the full azimuthal or zenithal angle range of the FOV may not be required. For such applications the 2D sensor may be arranged such that the central region of the sensor is located outside the optical axis of the lens system. For sensors with a large aspect ratio, such a spatially "shifted" detection has the additional advantage that it can increase the fill factor of the sensor. Another option is to combine two or more sensors with smaller detection area for detecting the image. Non-relevant image regions can thus be omitted during detection. The image can also be detected by one or more 1D sensor arranged inside the image of the FOV. 2D sensors and 1D sensors may also be used in combination.

In another preferred embodiment, a detection of the central region of the image is omitted by the sensor system. That means, the central region of the image is not detected by the sensor system and the electronic image signal does not contain image information for this region. Therefore, the electronic image signal of the sensor will not include undesired image information which therefore must not be processed by the calculation electronics. Due to less information, energy can be saved and the calculations of the calculations electronics can be accelerated.

In another preferred embodiment, the FOV preferably comprises zenithal angles between 80° and 100°, more preferably between 60° and 90° and even more preferably between 90° and 120°. These preferred fields of view correspond to a typical ZOI in a collision avoidance system.

In another preferred embodiment, the sensor system is combined with an emitter array. The sensor system and the emitter array may consist of individual elements or the sensor system and the emitter array form a combined transceiver system. A single lens system can therefore be used as a two-way optics for the illumination system and the imaging system of a conventional TOF depth sensing system. Using a single lens system reduces costs, weight and size of a corresponding collision avoidance system. Moreover, a combined transceiver system may have lower costs compared an individual sensor systems and a corresponding emitter array.

In another preferred embodiment, the sensor system and the emitter array form a coherent transceiver. With coherent TOF depth sensing systems the effective SNR can be increased compared to non-coherent systems such that higher detection efficiencies can be achieved even with less emitted light power or at long distances.

According to another aspect of the invention, there is provided a collision avoidance system comprising an imaging system according to the invention. A collision avoidance system is an electro-optical system adapted to provide means and methods for detecting and preventing collisions in a monitored environment. The collision avoidance system can be part of a security assistance system and may comprise as a further component control electronics adapted to determine a possible collusion and to initiate suitable measures to avoid such a collision. Suitable measures may range from simply issuing a warning message up to taking over full control over a protected apparatus or system to avert any damage.

Further aspects of the invention could be learned from the following description.

BRIEF DESCRIPTION OF THE DRAWINGS

In the following, the invention will be described in further detail. The examples given are adapted to describe the invention.

DETAILED DESCRIPTION

Figure 1:
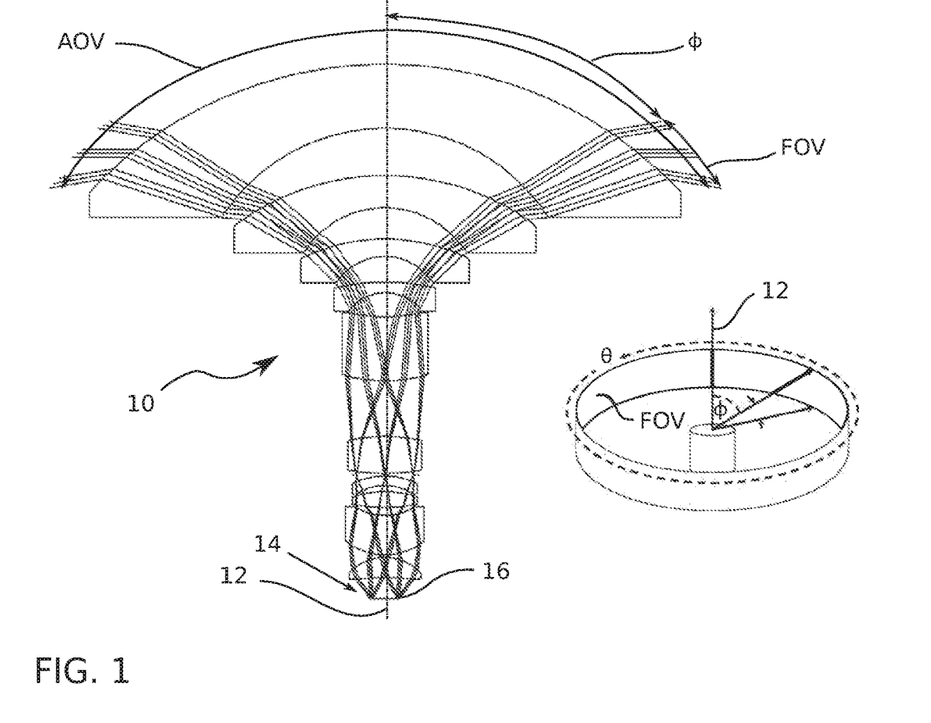
FIG. 1 shows calculated ray paths in a first embodiment of a lens system according to the invention.

FIG. 1 shows calculated ray paths in a first embodiment of a lens system 10 according to the invention. The inset shows the definition of the zenithal angles $\phi$ and azimuthal angles with respect to the optical axis 12 of the lens system 10. The depicted lens system 10 is fully refractive and consists of 10 glass lenses. However, the number of lenses and the material type can be replaced with other quantities and materials. The lens system is designed for a zenithal field of view (FOV) of 20° starting at a zenithal angle of 80°. The minimum angle of view (AOV) of the lens system 10 is thus 200°. All depicted rays are focused onto a common image plane 16, which is perpendicular to the central optical axis 12 of the lens system 10.

The lens system 10 shown is specific in that the individual rays are deflected from the FOV to the image plane 14 by four concave-convex (meniscus) lenses arranged in series, thus forming a deflecting lens stack. The rays from the FOV are transmitted only by the outer regions of these lenses such that their diameter can be reduced from one lens to the next in the direction of the image plane 14. The proposed shape of the convex-concave lenses can be easily produced and the adjustment of the lenses in the deflecting lens stack is simple compared to configurations including lenses with more complex lens shapes. As further shown, an imaging system for the deflected rays is arranged directly below the deflecting lens stack.

Figure 2:
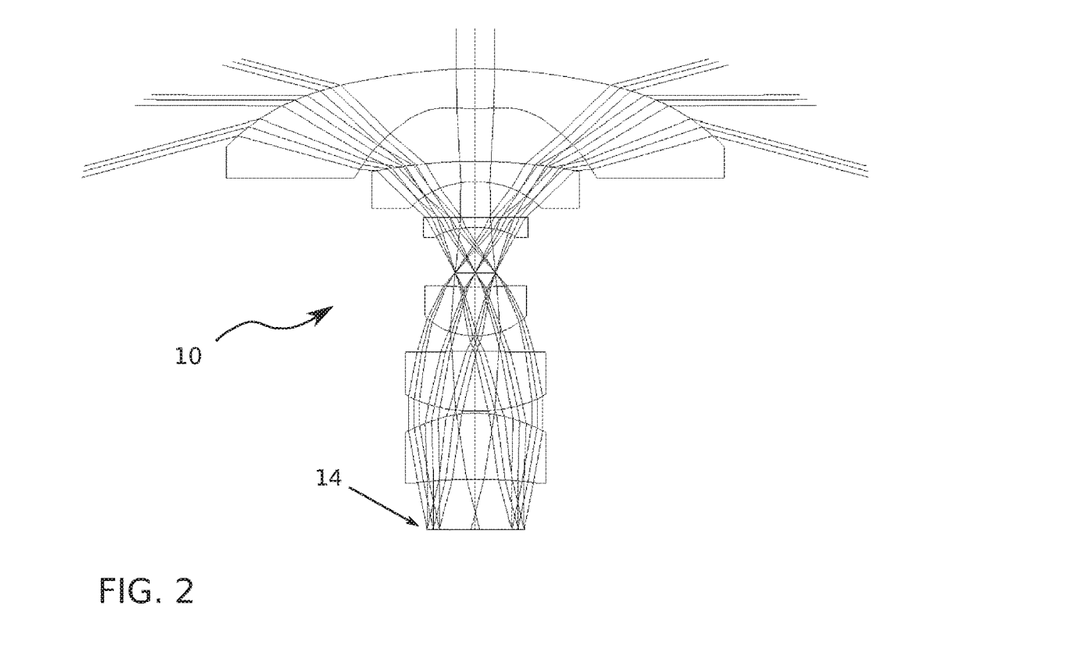
FIG. 2 shows calculated ray paths in a second embodiment of a lens system according to the invention.

FIG. 2 shows calculated ray paths in a second embodiment of a lens system 10 according to the invention. The lens system 10 is fully refractive and consists of six plastic lenses. However, the number of lenses and the material type can be replaced by other quantities and materials. The lens system is designed for a zenithal FOV of 30° starting at a zenithal angle of 75°. The minimum AOV of the lens system 10 is thus 210°. As it can be seen for the bundle of rays near the center of the lens system, rays under small zenithal angles are not focused well in the image plane 14 while rays in the FOV a sharply focused in the image plane 14. However, by targeting the design for a desired zenithal FOV as a zone of interest (ZOI), the requirements for a plastic lens design are highly simplified such that the lens system 10 can be designed in a less complex manner compared to glass-based wide-angle lens systems 10.

Figure 3:
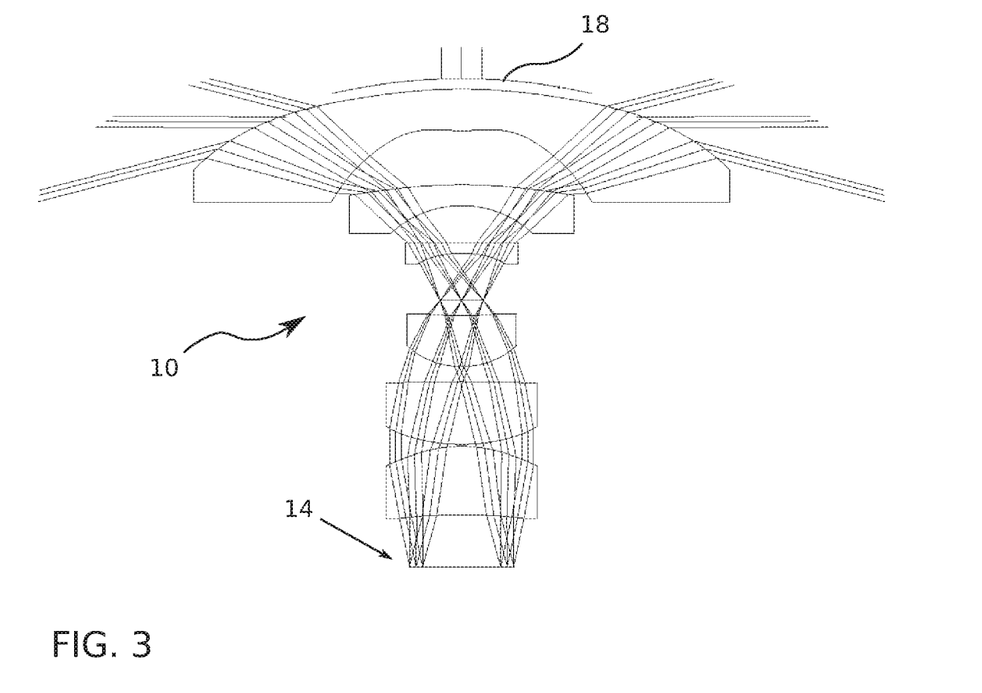
FIG. 3 shows calculated ray paths in a third embodiment of a lens system according to the invention.

The lens system 10 of this embodiment also comprises a deflecting lens stack arranged above an imaging system for the deflected rays. However, here only three lenses are included in the deflecting lens stack. In particular, the two outer convex-concave lenses of the lens stack in FIG. 1 are combined to a single convex-concave lens with a convex freeform shape in the direction of the image plane 14. The inner lens may preferably be a convex-concave lens or a plano-concave lens. The production of a freeform element is more complex but allows implementing optical correction directly to the deflecting lens stack. Thus, the total length of the lens system 10 can be decreased while good optical imaging quality is maintained. On the other hand, due to a more complex lens shape, the adjustment effort may be slightly increased. FIG. 3 shows calculated ray paths in a third embodiment of a lens system 10 according to the invention. The depicted lens system 10 corresponds to the lens system 10 shown in FIG. 2. Additionally a blind 18 covers the central area of the lens system 10 to block rays entering from the undesired smaller zenithal angles. However, a blind 18 can be used on any lens system 10 according to the invention. Preferably, the blind 18 can be a circular structure following the surface of the lens system on the object side (so-called curved circular blind 18). Other shapes of the blind 18 are possible to allow an individual transmittance of additional rays from selected zenithal angle ranges or to block specific azimuthal angle ranges. For example, a blind 18 can also be elliptically shaped or in the form of two circular blinds attached to one another along a section of their circumferences (with or without curvature). As a blind 18 blocks rays entering from the smaller zenithal angles, only rays in the FOV are focused in the image plane 14.

Figure 4:
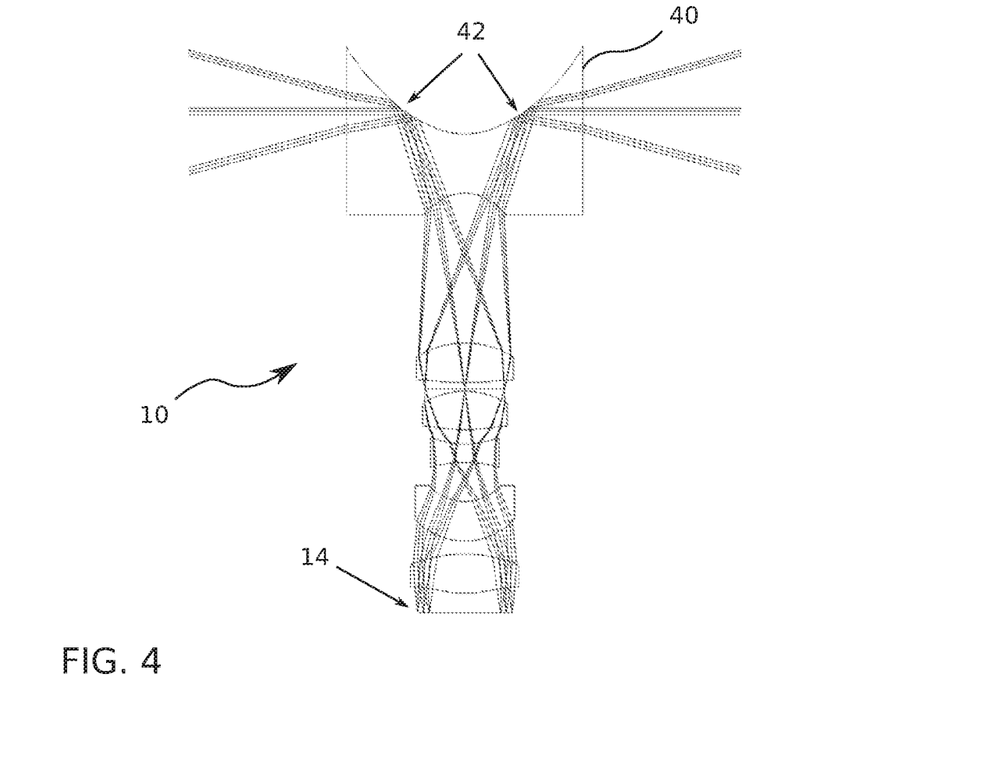
FIG. 4 shows calculated ray paths in a fourth embodiment of a lens system according to the invention.

FIG. 4 shows calculated ray paths in a fourth embodiment of a lens system 10 according to the invention. The lens system 10 is a catadioptric lens system 10 comprising refractive and reflective optical components. The first component of the depicted lens system 10 is a biconcave lens element 40 in which object rays are reflected by a single total internal reflection 42 (TIR). Object rays in the FOV enter the lens element 40 from the side and are reflected at the inner surface on the top of the lens element 40. In this embodiment, a zenithal FOV of 30° is realized starting at a zenithal angle of 75°. Rays from outside the FOV are practically blocked as the condition for TIR and the concave shape of the top surface of the lens element 40 are limiting the imageable zenithal angle range. An additional blind may thus not be required for blocking undesired smaller zenithal angles.

In this lens system 10, the individual rays are deflected from the FOV to the image plane 14 by a single optical element, i.e., the biconcave lens element 40. The concave curvature of biconcave lens element 40 at the side where the TIR occurs is adapted to directly deflect the rays from the FOV in the direction of the mage plane 14. The TIR region may have a parabolic or a freeform profile. The concave curvature of biconcave lens at the opposite side forms a dispersing lens for the deflected rays and directs them to the related imaging system for the deflected rays, which is arranged directly below. An advantage of such a configuration is that the adjustment process can be simplified and the system stability may be increased compared to systems comprising a number of individual lenses, but at the expense of increased difficulty in the production of a correctly shaped biconcave lens element 40. Because the imageable zenithal angle range is intrinsically limited, scattered light can be reduced inside the lens system 10.

Figure 5:
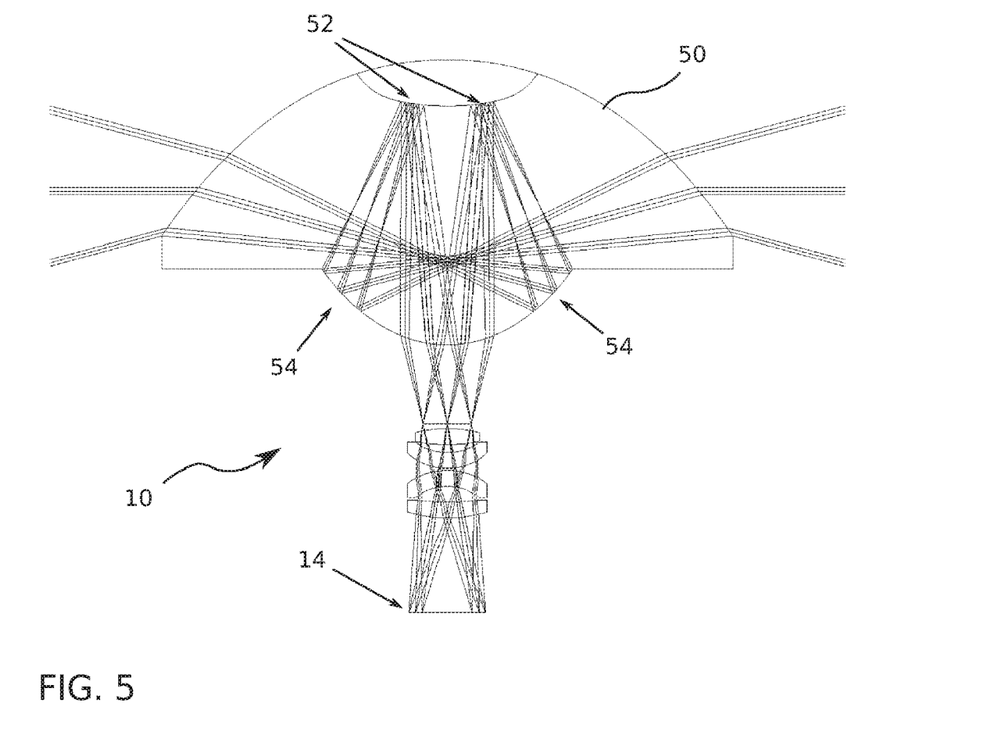
FIG. 5 shows calculated ray paths in a fifth embodiment of a lens system according to the invention.

FIG. 5 shows calculated ray paths in a fifth embodiment of a lens system according to the invention. Also this lens system 10 is a catadioptric lens system 10 comprising refractive and reflective optical components. The first component of the depicted lens system 10 is a complex freeform lens element 50 in which object rays are reflected by two total internal reflections 52, 54. Object rays in the FOV enter the freeform lens element 50 from the side and are reflected first at the inner surface on the bottom of the lens element 50 and second at the inner surface on the top of the lens element 50. In this embodiment, a zenithal FOV of 30° is realized starting at a zenithal angle of 75°. The lens element 50 is formed such that only rays in the FOV can enter the following parts of the lens system 10. In particular, the freeform shapes of the surfaces of the top and of bottom of the lens element 50 are designed such that zenithal rays with angles not corresponding to the FOV are blocked. Also in this embodiment, an additional blind may not be required for blocking undesirable smaller zenithal angles.

In this lens system 10, the two total internal reflections 52, 54 enhance the selectivity for rays from the FOV even more. Scattered light or light incoming from other directions located outside the FOV can thus effectively suppressed. The ray paths inside the lens element 50 can simply be adapted to the required FOV. The lens element 50 can be a combination of thick spherical lens region at the circumference and two freeform regions on the top and on the bottom of the lens element 50. In particular, the freeform region at the top of the lens element 50 may be a concave shape and the freeform shape at the bottom of the lens element 50 may be convex shape. The central region of the bottom of the lens element 50 may further include a lensing function for the rays directly directed towards to image plane 14 and in particular the imaging system for the deflected rays. Besides reduced light scattering, another advantage of this embodiment is the simple alignment and increased stability resulting from the low total number of optical elements in the lens system 10. However, due to the two-fold ray path inside the lens element 50, the diameter of the lens element 50 becomes large while the total length of the lens system 10 can be shortened compared to other embodiments of the invention.

Figure 6:
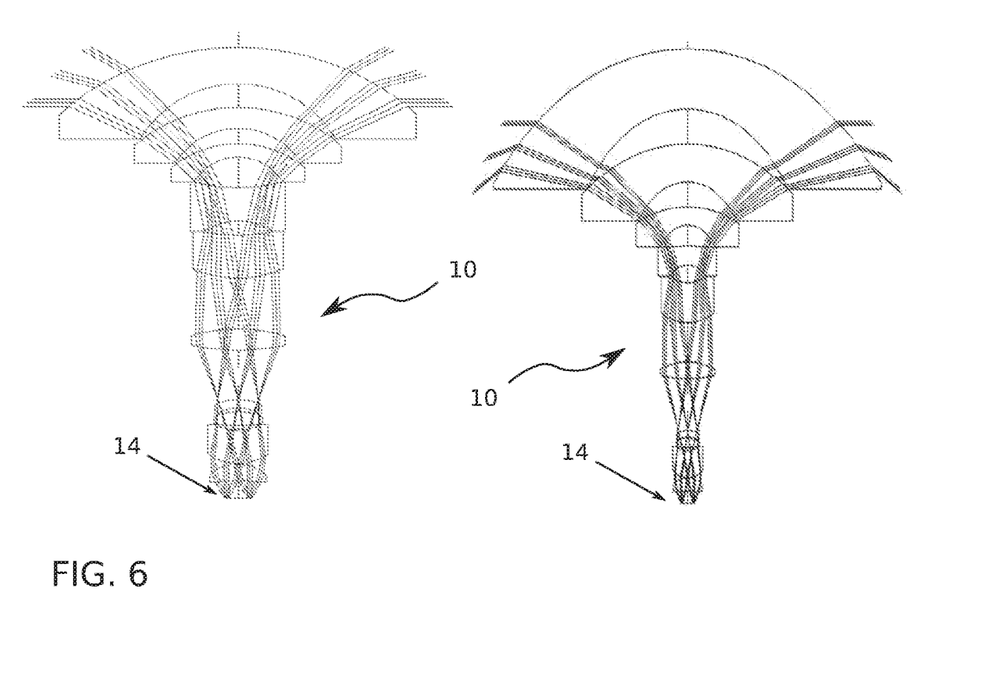
FIG. 6 shows calculated ray paths in further exemplary embodiments of lens systems according to the invention.

FIG. 6 shows calculated ray paths in further exemplary embodiments of lens systems 10 according to the invention. The depicted lens systems 10 are similar to the lens system 10 shown in FIG. 1, however, any lens system according to the invention could be applied. In the figure different realizations of a zenithal FOV in such lens systems 10 are illustrated. The left lens system 10 has a zenithal angular range from 60° to 90° corresponding to a FOV of 30°. The right lens system 10 shows a zenithal angular range from 90° to 120° which again corresponds to a FOV of 30° (minimum AOV is 240°). However, the position and the size of the FOV can be selected from a wide zenithal angular range. Preferred are zenithal fields of view between 20° to 40° which are selected in a zenithal angular range starting from 60° and reaching up to more than 150°.

Figure 7:
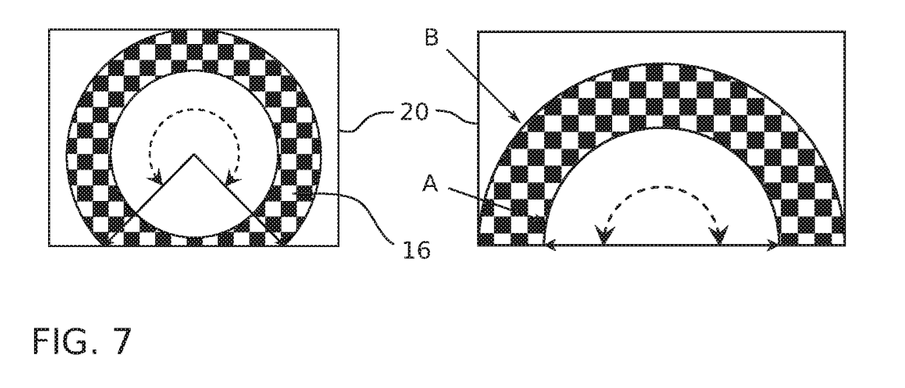
FIG. 7 shows illustrations of single 2D image sensors detecting a reduced azimuthal angle range of the image.

FIG. 7 shows illustrations of single 2D image sensors 20 detecting a reduced azimuthal angle range of the image 16. Detecting only a reduced azimuthal angle range may be desired when a full panoramic perspective is not required for a specific application. If the imaging system 10 is installed such that a part of the FOV is obscured and can thus not be used for imaging or collision avoidance, the sensor 20 may be shifted along the image plane in relation to the optical axis 12. Other options are to change the size of the sensor 20 or adapting the lens system 10 to maximize the area of detection on the sensor 20. In the left illustration, the azimuthal FOV is around 270°, while in the right illustration an azimuthal FOV of 180° is imaged on the sensor. In the illustrations, the smallest zenithal angles in the FOV are imaged at the inner border A of the image 16, while the largest zenithal angles in the FOV are imaged at the outer border B of the image 16. By limiting the detected azimuthal angular range, the image resolution can be increased by using the full detection area of the sensor 20 for the remaining azimuthal angular range.

Figure 8:
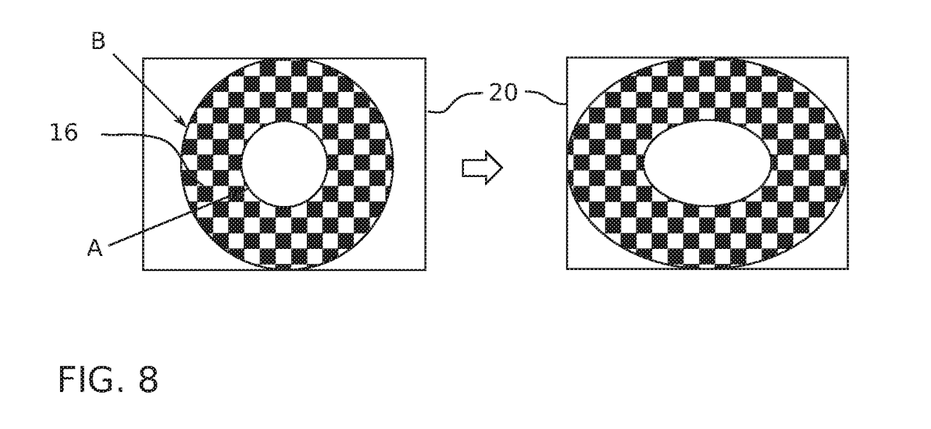
FIG. 8 shows an illustration of using anamorphic distortion for maximizing the achievable image resolution.

FIG. 8 shows an illustration of using anamorphic distortion for maximizing the achievable image resolution. An axially symmetric lens system 10 images the FOV 16 as a circle in the image plane 14. When using a single 2D sensor 20 with a rectangular detection surface, a large number of pixels may not be used because of the different aspect ratios of the image 16 and the sensor 20. By using anamorphic distortion in the lens system 10, preferably by adding cylindrical and/or toroidal lenses, the aspect ratios can be matched such that the image 16 can be detected by a maximum number of pixels on the sensor 20. The applied anamorphic distortion thus creates different magnifications in the horizontal and vertical directions on the image sensor 20 in the image plane 14, which provides an increased usage of the pixels on the image sensor 20 and therefore allows better light collection. Furthermore, with a larger magnification, the resolution of the detection can be enhanced for the magnified regions in the image 16. Therefore, the imaging system 10 can be aligned such that some regions of the FOV may be imaged with an increased optical quality.

Figure 9:
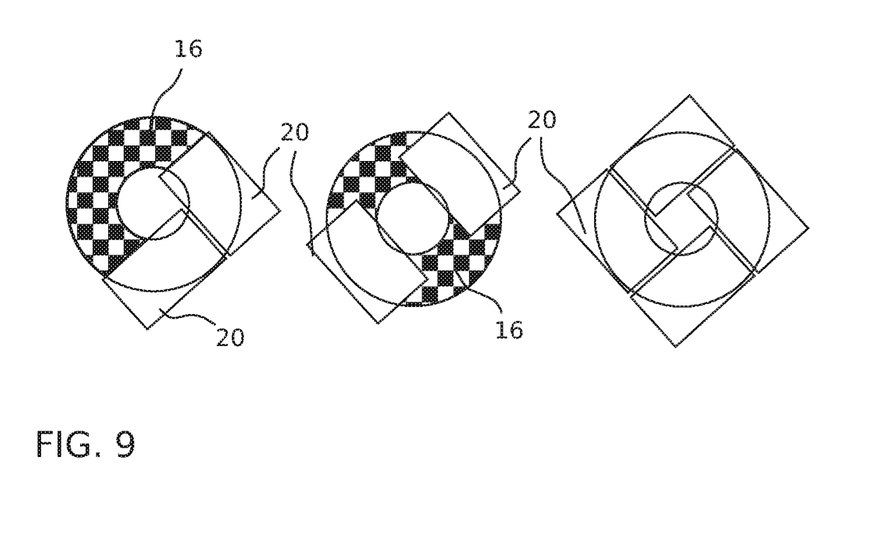
FIG. 9 shows exemplary embodiments of a sensor system according to the invention.

FIG. 9 shows exemplary embodiments of a sensor system 20 according to the invention. The sensor system 20 comprises at least a single 2D detector, at least a single 1D Detector or a combination thereof. By selecting a specific type of sensor arrangement, the image can be fully or partly comprised to allow a specialized detection of different parts of the image 16. The illustrations show how two or four rectangular detectors can be used to detect the image 16. In all shown embodiments, a detection of the central region of the image 16 in the image plane 14 is omitted by the sensor system 20. This saves costs, allows an increased optical resolution and avoids a time- and energy-consuming processing of undesired information in the electronic image signal by the calculation electronics 30.

Figure 10:
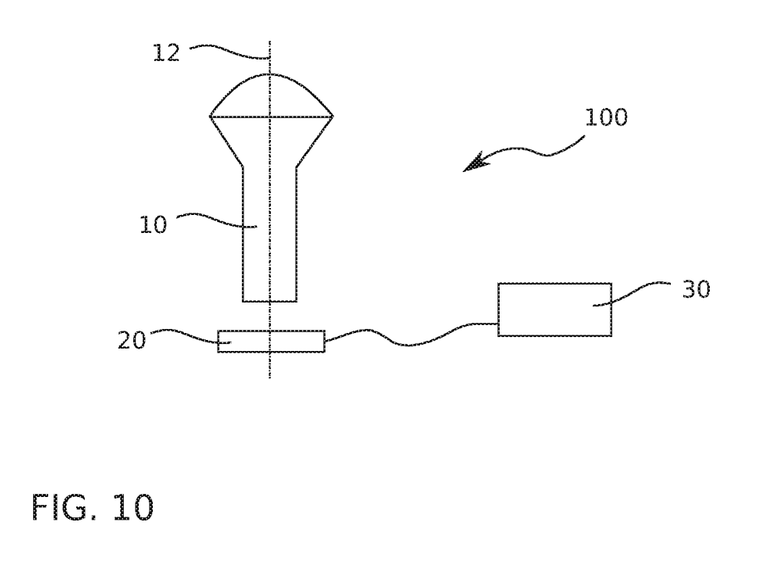
FIG. 10 a schematic view of an exemplary embodiment of an imaging system according to the invention.

FIG. 10 shows a schematic view of an exemplary embodiment of an imaging system 100 according to the invention. The depicted imaging system 100 comprises a lens system 10, adapted for imaging angles of view larger than 120° symmetrically around the optical axis 12 of the lens system 10 in an image 16 on an image plane 14 perpendicular to the optical axis 12 of the lens system 10; a sensor system 20, adapted to convert at least a part the image 16 in the image plane 14 into an electronic image signal; and an evaluation electronics 30, adapted to analyze the electronic image signal and to output resulting environmental information; wherein the lens system 10 and/or the sensor system 20 are designed for specifically imaging fields of view starting at zenithal angles larger than 80°.

LIST OF REFERENCE NUMBERS 10 lens system
12 optical axis
14 image plane
16 image
18 blind
20 sensor system
30 evaluation electronics
40 biconcave lens element
42 total internal reflection
50 complex freeform lens element
52 first total internal reflection
54 second total internal reflection
100 imaging system
θ azimuthal angle
φ zenithal angle
AOV angle of view
FOV field of view
TOF time-of-flight
ZOI zone of interest
A, B borders of the imaged FOV

What is claimed is:

1. An imaging system for time-of-flight depth sensing applications, comprising:
   a lens system, adapted for imaging angles of view larger than 120° in an image on an image plane;
   a sensor system, adapted to convert at least a part the image in the image plane into an electronic image signal; and
   an evaluation electronics, adapted to analyze the electronic image signal from the sensor system and to output resulting environmental information, wherein the evaluation electronics is adapted to correct optical distortions in the electronic image signal and to output undistorted image information using predefined lens system data;
   wherein the lens system and/or the sensor system are designed for specifically imaging fields of view starting at zenithal angles larger than 60°, and
   wherein the lens system is a deflecting lens stack including four concave-convex lenses arranged in series and rays are transmitted only by outer regions of the deflecting lens stack such that diameters can be reduced from one lens to the next in the direction of the image plane.

2. The imaging system according to claim 1, wherein the central region of the entrance aperture of the lens system is covered by a blind and at least a single region other than the central region is covered by a blind, wherein selection of the at least single region is flexible.

3. The imaging system according to claim 1, wherein the lens system comprises plastic lenses, glass lenses or a combination thereof.

4. The imaging system according to claim 1, wherein the sensor system comprises at least a single 2D sensor, at least a single 1D sensor or a combination thereof, wherein such a sensor is located outside an optical axis of the lens system.

5. The imaging system according to claim 1, wherein a detection of the central region of the image is omitted by the sensor system.

6. The imaging system according to one claim 1, wherein the field of view comprises zenithal angles between 80° and 100°, between 60° and 90° or between 90° and 120°.

7. The imaging system according to claim 1, wherein the sensor system is combined with an emitter array.

8. The imaging system according to claim 7, wherein the sensor system and the emitter array forming a coherent transceiver.

9. The imaging system according to claim 1, wherein the sensor system comprises multiple sensors combined to omit non-relevant image areas.

10. The imaging system according to claim 1, wherein the environmental information includes an object identifier and a numerical value for a distance from a reference point to the recognized object.

11. The imaging system according to claim 1, wherein the lens system is optimized to provide diffraction-limited imaging for all imaging points in the angles of view.

12. A collision avoidance system comprising an imaging system imaging system for time-of-flight depth sensing applications, the imaging system comprising:
- a lens system, adapted for imaging angles of view larger than 120° in an image on an image plane;
- a sensor system, adapted to convert at least a part the image in the image plane into an electronic image signal; and
- an evaluation electronics, adapted to analyze the electronic image signal and to output resulting environmental information, wherein the evaluation electronics is adapted to correct optical distortions in the image signal and to output undistorted image information using predefined lens system data;
- wherein the lens system and/or the sensor system are designed for specifically imaging fields of view starting at zenithal angles larger than 60°, and
- wherein the lens system is a deflecting lens stack including four concave-convex lenses arranged in series and rays are transmitted only by outer regions of the deflecting lens stack such that diameters can be reduced from one lens to the next in the direction of the image plane.

* * * * *